United States Patent [19]
Lohmann

[15] 3,707,342
[45] Dec. 26, 1972

[54] INJECTION MOLDING APPARATUS FOR FOAMED PLASTICS

[72] Inventor: Albert Lohmann, Niederkuchten, Germany

[73] Assignee: Mannesman-Meer Aktiengesellschaft, Monchengladbach, Germany

[22] Filed: Dec. 21, 1970

[21] Appl. No.: 100,234

[52] U.S. Cl. ................................. 425/242, 425/450
[51] Int. Cl. .................................................. B29f 1/00
[58] Field of Search ....... 18/30 JA, 30 LM, 30 LD, 30 LE, 18/30 PM, 30 PG, 30 PA, 30 RM; 30 RP, 30 PP, 30 PQ, 30 PR, 30 PS, 30 PT; 425/242, 450, 451

[56] References Cited

UNITED STATES PATENTS

| 3,205,536 | 9/1965 | Funck ................................. 18/30 PS |
| 3,533,137 | 10/1970 | Michelson ........................ 18/30 LM |
| 3,063,092 | 11/1962 | Fischer ............................... 18/30 PP |
| 3,224,043 | 12/1965 | Lameris et al. ....................... 425/246 |

FOREIGN PATENTS OR APPLICATIONS

| 1,124,235 | 2/1962 | Germany ............................ 18/30 PS |
| 1,292,295 | 3/1962 | France ............................... 18/30 PP |

Primary Examiner—J. Spencer Overholser
Assistant Examiner—David S. Safran
Attorney—Smyth, Roston & Pavitt and Ralf H. Siegemund

[57] ABSTRACT

Two molds are spaced apart in tandem with a dual nozzle injection unit positioned therebetween to fill the two molds alternately. The cooling periods of the two closed molds overlap in time and while one mold is cooling the other one is opened, emptied of its molded part, closed again and injected with a new charge of plastic. During the cooling period of one mold the injection unit not only injects plastic into the other mold but also recharges for a new operating cycle.

11 Claims, 2 Drawing Figures

INJECTION MOLDING APPARATUS FOR FOAMED PLASTICS

BACKGROUND OF THE INVENTION

A problem in the molding of thick walled plastic bodies is the extensive period of time required for cooling the bodies in the molds, the cooling period drastically lowering the rate of production that is attainable with conventional molds. Production may be increased, of course, by using a turntable carrying a plurality of molds. It is also old in the art to employ superimposed molds in an attempt to increase production, as disclosed, for example, in the German Gebrauchsmuster patent 1,984,302. It is also old in the art to employ two alternately loadable molds with their mold halves raised and lowered hydraulically for the production of hard plastics, for example, in the production of Bakelite parts as disclosed in German patent 1,479,819.

SUMMARY OF THE INVENTION

The present invention takes advantage of the fact that an endothermic effect is produced in the expansion of a gas to produce a foamed plastic e.g. polystyrol, and, in spite of the high insulation provided by the entrained gas bubbles, this cooling effect reduces the required cooling period for thick walled foamed plastic products so much that it is not economical to use rotary equipment such as a turntable.

In the practice of the present invention, one end of a reciprocative main carriage carries the first half of a first mold and the second half of the first mold is mounted on an auxiliary carriage that is adjacent said one end of the main carriage. The other end of the main carriage carries the first half of a second mold and the second half of the second mold is stationary in a position confronting said other end of the main carriage.

An injection unit positioned between the two mold halves on the main carriage fills the two closed molds alternately. Power means reciprocates the two carriages to open and close the two molds with the closed period of the two molds overlapping to overlap their cooling periods and to permit each mold to be opened, emptied, closed and refilled while the other mold remains closed through its cooling period.

The various features and advantages of the invention may be understood from the following detailed description and the accompanying drawings.

DESCRIPTION OF THE PREFERRED EMBODIMENT OF THE INVENTION

Figure 1:
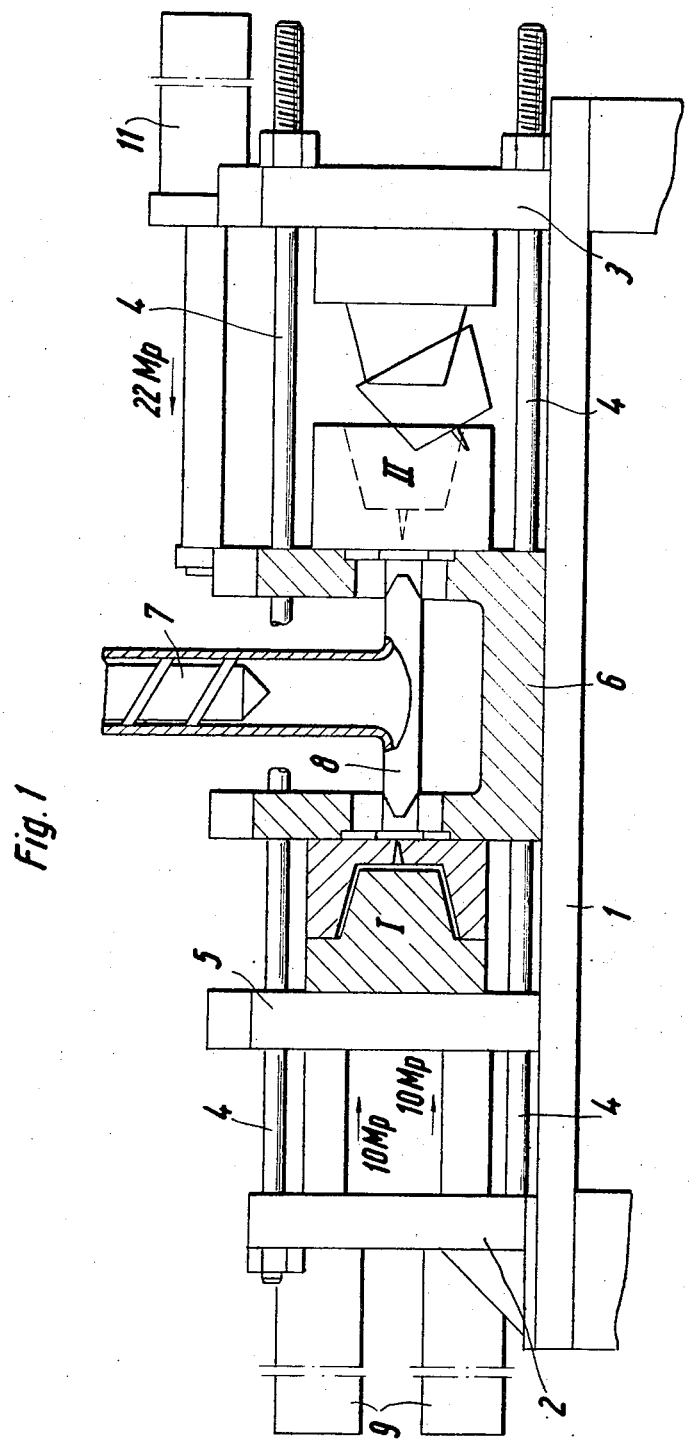
FIG. 1 is a side elevational view partly in the section illustrating the presently preferred embodiment of the invention, one of the two molds being closed for a cooling period and the other mold being open for removal of a molded part.

Referring to the drawings, a support structure 1 serves as a track for two carriages and includes upright support members 2 and 3 at the opposite ends respectively of the structure with a plurality of longitudinal guide rods anchored at their opposite ends in the two upright members. An auxiliary carriage 5 and a main carriage 6 slide on the guide rods 4 for the purpose of opening and closing two molds designated I and II.

The main carriage 6 is U-shaped as viewed in side elevation with two upright end walls and one half of mold I is mounted on one of the two end walls of the main carriage with one half of mold II mounted on the other end wall. An injection unit 7 having two opposite nozzles 8 is shown in a central retracted position in FIG. 1 and is movable independently of the main carriage in opposite directions to fill the two molds alternately. The second half of mold I is mounted on the auxiliary carriage 5 in position to mate with the first half of mold I on the main carriage. In like manner the second half of mold II is mounted on the vertically adjustable upright support 3 in a position to mate with the first half of the mold on the main carriage.

Two fluid-pressure-actuated power cylinders 9 are mounted on the upright support 2 for the purpose of actuating the auxiliary carriage 5 and, in like manner two fluid-pressure-actuated power cylinders 11 are mounted on the upright support member 3 to actuate the main carriage 6.

The preferred mode of operation of the apparatus is as follows:

Starting with the movable parts in the positions shown in FIG. 1, the main carriage 6 is in its left limit position to hold mold II open for the removal of a plastic casting therefrom and mold I which has been newly closed and is now empty and is held under relatively high closing pressure by the two opposite forces applied by the power cylinders 9, on one hand, and applied by the power cylinders 11 on the other hand.

The injection unit 7 which is shown in its central retracted position in FIG. I, is now shifted leftward to fill newly closed mold I, and then the injection unit is returned to its central position for a time period in which it is recharged with plastic. As the cooling period of mold I initiated, mold II is still open for removal of molded part therefrom. The combined pressure force exerted by cylinder 11 upon part 6 and by cylinders 9 upon the mating part of mold I is low but sufficient to keep mold I closed.

Figure 2:
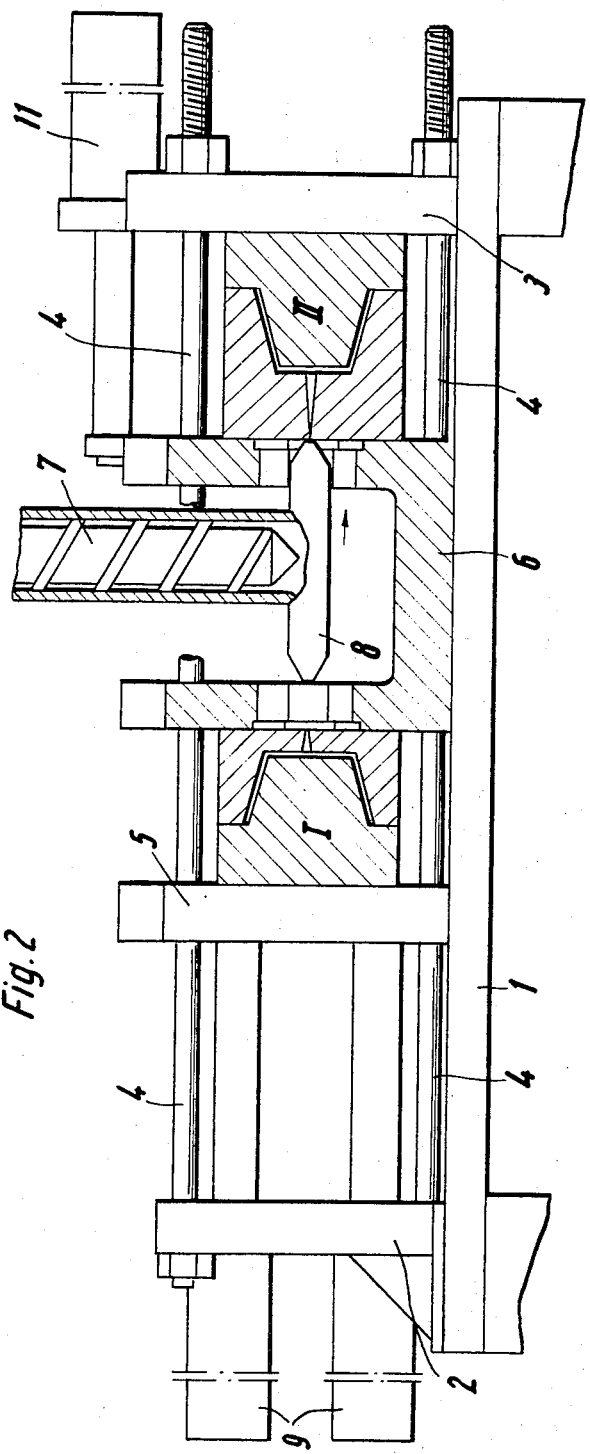
FIG. 2 is a similar view showing both molds closed with the one mold in its cooling period and with the dual nozzle injection unit filling the other mold.

After the molded part is removed from mold II, the main carriage 6 is shifted to its right limit position, shown in FIG. 2, to close mold II. The shifting of carriage 6 from its left limit position to its right limit position is accomplished by maintaining pressure in the power cylinders 11 tending to move carriage 6 to the left, but by initiating and maintaining higher pressure in the power cylinders 9 so that auxiliary carriage 5 pushes carriage 6 to the right. The power cylinders 9 overcome the pressure of power cylinders 11 to cause the carriage to shift to its right limit position and at the same time mold I is kept under closing pressure during the rightward shift.

After mold II has been closed and is maintained closed under relatively high pressure, injection unit 7 is now moved rightward to fill mold II and is then returned to its central retracted position for recharging. Cooling begins in mold II, cooling in mold I continues; both molds are maintained closed. During the later portion of the cooling period of mold II, mold I is opened, emptied and again closed. The opening of mold I is accomplished by energizing the power cylinders 9 to retract the auxiliary carriage 5 with the power cylinders 11, pulling part 6 to the right for continuing to keep mold II closed under pressure. After the casting is removed from mold I, power cylinder 9 again advances the auxiliary carriage 5 to close mold I and with power cylinders 9 applying maximum force,both, the molds are under maximum pressure. Both molds are now in their cooling periods again.

Subsequently, power cylinders 11 are energized to shift the carriage 6 to its leftward position against the opposition of the considerably reduced pressure from the cylinders 9 thereby to open mold II while keeping mold I closed under reduced closing pressure. The figures in FIG. 1 denote force in megapond (1 kilopond being 2.205 lb-f.) As can be seen, the pressure forces are unbalanced to move the carriage 6 to the left with mold I remaining closed. The moving parts of the apparatus are now back at their starting positions for repetition of the sequence of operations.

It is important to note that the cooling periods of the two molds overlap in time by substantial amounts for production efficiency and that both molds are closed for approximately two-thirds of the cooling period of each mold. During the remaining one-third of the cooling period of each, the other mold is opened, emptied and again closed. Opening of one mold is accomplished by changing the pressure balance so as to maintain reduced closing pressure on the respective other mold. With further reference to economy in time, it is to be noted that the injection unit recharges during the two cooling periods of the two molds respectively. Thus, the invention makes maximum use of the two molds to fill the need for an economical method of producing foamed plastic parts and especially massive foamed plastic parts having thick walls, using, for example, polystyrol.

My description of the presently preferred practice of the invention will suggest various changes, substitutions and other departures from my disclosure within the spirit and scope of the appended claims.

I claim:

1. In an injection molding apparatus for plastic materials, the combination which includes a main carriage, an auxiliary carriage and power means to reciprocate the two carriages;
   a first mold with relatively movable halves and a second mold with relatively movable halves, the two molds being spaced-apart;
   a first half of the first mold being on one end of the main carriage and the second half of the first mold being positioned on the auxiliary carriage to mate with the first half;
   a first half of the second mold being on the other end of the main carriage;
   the second half of the second mold being stationary in a position confronting said other end of the main carriage to mate with the first half of the second mold, said power means opening and closing said two molds alternately upon reciprocating the two carriages;
   an injection unit positioned between the two molds and movable to the two molds alternately to fill the two molds;
   said injection unit extending into the space between the two mold halves on the main carriage.

2. A combination as set forth in claim 1
   in which said main carriage and auxiliary carriage are movable on a fixed support structure
   and in which said power means comprises a first power means mounted on one end of the fixed structure to actuate the main carriage and a second power means mounted on the other end of the fixed structure to actuate the auxiliary carriage.

3. A combination as set forth in claim 2 in which the two carriages are mounted on a plurality of guide rods with the opposite ends of the guide rods mounted on the opposite ends of the fixed structure.

4. A combination as set forth in claim 3 in which each of said power means is a fluid-pressure-actuated power means.

5. A combination as set forth in claim 1 in which said injection unit has two oppositely directed nozzles to cooperate with the two molds respectively.

6. A combination as set forth in claim 1 in which said carriage is U-shaped in configuration, the two legs of the U-shape configuration being two opposite transverse end walls respectively of the carriage;
   and in which the first half of the first mold and the first half of the second mold are mounted on said two end walls respectively.

7. The combination as in claim 6, the injection unit slidably disposed in the interior of the U-shaped carriage.

8. The combination as in claim 1, there being guide rods for slidable mounting the main carriage and the auxiliary carriage for individual reciprocating motion, first and second support means for positioning the rods, first hydraulic motor means on the first means and coupled to the auxiliary carriage for displacement thereof and second hydraulic motor means on the second means and coupled to the main carriage for displacement thereof, the second half of the second mold mounted to the second support means.

9. The combination as in claim 8, the second support means disposed for adjustment transverse to the extension of the guide rods.

10. In an injection molding apparatus for plastic materials, the combination comprising:
    a first mold having first and second halves;
    a second mold having first and second halves;
    a carriage disposed for reciprocating motion and supporting each of the first mold halves of the first and second molds;
    first means for mounting the second half of the first mold;
    second means for displaceably mounting the second half of the second mold for reciprocating relative to and colinear with the carriage;
    first driving means connected to the carriage and to the first means and operating for reciprocating the carriage so as to move the first mold half of the first mold relative to the second mold half of the first mold for opening and closing the first mold;
    second driving means coupled to the second means for moving the second mold halve of the second mold relative to the carriage colinear with the direction of reciprocating motion as imparted by the first driving means upon the carriage for opening and closing the second mold, so that the closing times of both molds overlap significantly, the first and second driving means moving in unison with the carriage when upon opening the first mold the second mold is to remain closed; and injection means for alternatingly charging the first and second molds respectively upon closing thereof.

11. In an apparatus as in claim 10, the second driving means reciprocating the second mold half of the second mold, while the carriage remains stationary for keeping the first mold closed;

the first and second means reciprocating in unison for opening and closing the first mold while keeping the second mold closed.

* * * * *